UNITED STATES PATENT OFFICE.

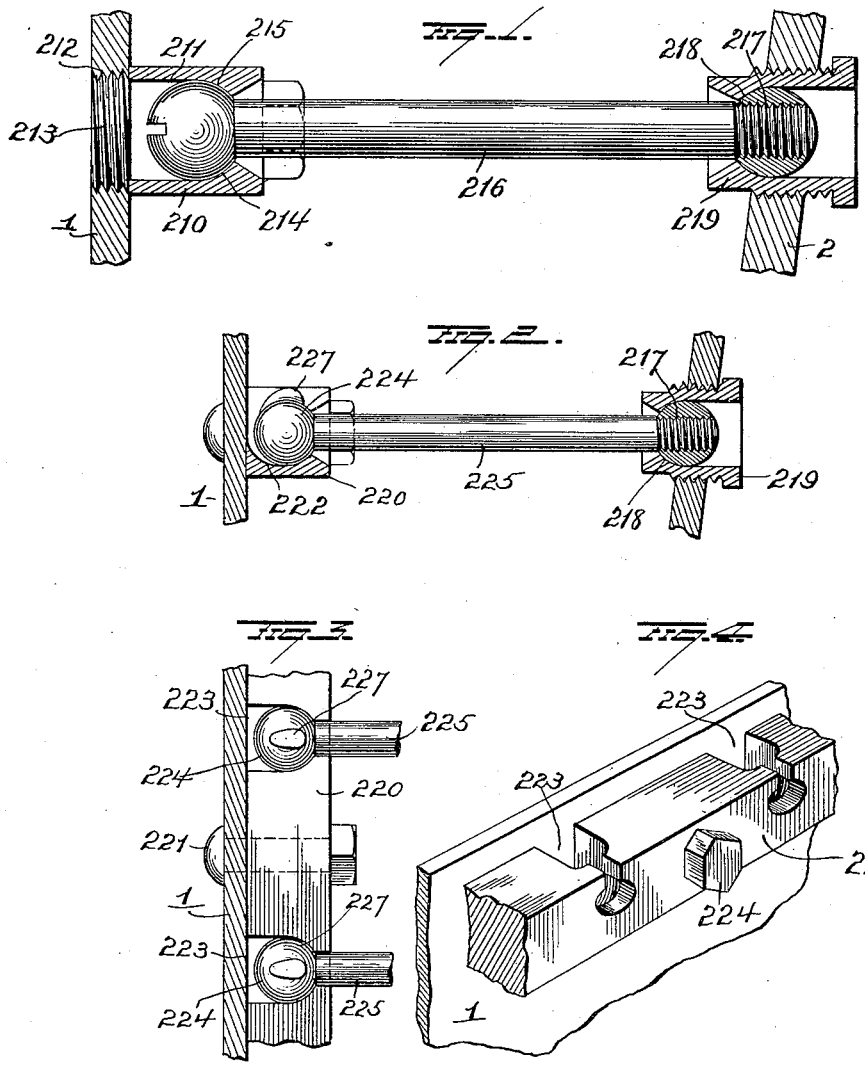

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,077,053.   Specification of Letters Patent.   Patented Oct. 28, 1913.

Original application filed September 25, 1911, Serial No. 651,051. Divided and this application filed September 21, 1912. Serial No. 721,676.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible bolts such as are employed for connecting the outside and inside plates of locomotive and other boilers, and is a division of application Serial Number 651,051, filed September 25th, 1911.

The object of the invention is to provide an improved stay bolt capable of a universal angular movement or yield at or near both ends thereof, so that the stay-bolt will be relieved of any vibration due to the expansion of the fire-box and crown sheets, and permitting the sheets to expand and contract at will.

Another object of the invention is to provide a stay-bolt that can readily be applied from the inside without the trouble and expense of dismantling the engine, and can be adjusted at any time, if necessary.

A further object of the invention is to provide a connector bar to which a series of bolts may be flexibly attached.

In the accompanying drawings Figure 1 is a view partly in elevation and partly in section showing my improvement applied to the walls of a boiler. Fig. 2 is a similar view of a modified form. Fig. 3 is a view in plan of the form shown in Fig. 2 and Fig. 4 is a view in perspective of the bar.

1 represents the inside wall or plate of the boiler, 2 the outside plate or wall, and 210 is a bar secured by bolts or any other suitable means to the wall 1. This bar is provided with a plurality of sockets 211, opening through its outer side, said sockets registering with holes 212 in the wall 1 through which the bolts are entered. These holes may be closed by threaded caps 213. The sockets 211 are formed with concave seats 214 each engaging a head 215 of a bolt-shank 216, the opposite ends of the latter receiving threaded ball-nuts 217, engaging seats 218 formed in bushings 219, secured with the wall 2, there being a single bushing 219 for each bolt.

In the construction shown in Figs. 2, 3 and 4, a bar 220 is secured to the inner side of wall 1, by rivets 221, and is similar to the bar 210 except that the sockets 222 therein, open through the upper side of the bar as shown at 223 to permit the introduction of the ball heads 224 of the bolt shank 225. The opposite ends of the bolt shanks 225 are threaded to receive the ball-nuts 217 which as in the previous construction bear against the curved seats 218 formed in the bushing 219. To prevent the bolt shanks from making a complete rotation or in other words to hold them while screwing up the nuts 217, the heads 224 are provided with lugs 227 adapted to engage the opposite sides of the sockets 223. These lugs do not interfere with the angular movements or adjustments of the bolt, but simply operate to prevent a complete rotation of the bolt.

In the construction shown in Figs. 2, 3, and 4, the bolts are introduced through the holes for the bushings and the heads are dropped into the seats in the bar after which the bushings are screwed home and the ball nuts entered in the ends of the bolts.

It is evident that many slight changes might be resorted to in the relative arrangement of parts shown and described without departing from the spirit and scope of my invention as set forth in the annexed claims. Hence I would have it understood that I do not confine myself to the exact construction and arrangement of parts shown and described, but, Having fully described my invention what I claim as new and desire to secure by Letters-Patent, is:—

1. The combination of a bar having a plurality of recessed seats open at the top, a plurality of headed stay bolts, the heads of which are mounted in said seats and means for securing the opposite ends of said bolts to a wall of the boiler.

2. The combination of a bar having a plurality of recessed seats, a plurality of headed stay bolts, each head having a lug to limit its rotation, and means for securing the opposite ends of said bolts to a wall of the boiler.

3. The combination of a bar having a plurality of recessed seats open at the top, a plurality of headed stay bolts, each head having a lug to limit its rotation, and means for securing the opposite ends of the stay bolts to a wall of the boiler.

4. The combination of a bar secured to one wall of the boiler and having a plurality of seats, a series of bushings secured to the other wall each bushing having a seat, and a plurality of stay bolts having integral heads at one end resting in the seats in the bar, each bolt having a removable head supported against a seat in a bushing.

In testimony whereof, I have signed this specification in the presence of two subscribing witnesses.

ETHAN I. DODDS.

Witnesses:
A. W. BRIGHT,
GEO. F. DOWNING.

Copies of this patent may be obtained for five cents each, by addressing the "Commissioner of Patents, Washington, D. C."